United States Patent Office 3,737,430
Patented June 5, 1973

3,737,430
N,N'-BIS[(TRI(SUBSTITUTED))SILYLALKYLENE]-
1,4-XYLENE-α,α'-DIIMINE
Lloyd H. Brown, Crystal Lake, Andrew P. Dunlop, Riverside, and Daniel S. P. Eftax, Barrington, Ill., assignors to The Quaker Oats Company, Chicago, Ill.
No Drawing. Original application Mar. 3, 1971, Ser. No. 120,737, now Patent No. 3,681,420, dated Aug. 1, 1972. Divided and this application Apr. 5, 1972, Ser. No. 241,475
Int. Cl. C09b 23/00
U.S. Cl. 260—240 G
3 Claims

ABSTRACT OF THE DISCLOSURE

A new composition of the formula:

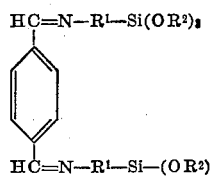

wherein $R^1$ is an alkylene radical and wherein $OR^2$ is a hydrolyzable group and $R^2$ is alkyl, aryl, heterocyclic, or substituted derivatives thereof; useful for example in promoting resin to sand and resin to resin bonds.

BACKGROUND OF THE INVENTION

Field of the invention

This is a division, of application Ser. No. 120,737, filed Mar. 3, 1971, now U.S. Pat. 3,681,420, granted Aug. 1, 1972.

This invention relates to new and useful organosilicon compounds. More particularly, the invention relates to organosilicon compounds containing an N,N'-bis[(tri(substituted))silylalkylene]-1,4-xylene-α,α' - diimine grouping wherein the imine group is interconnected to the silicon atom of the silyl grouping through at least three carbon atoms.

Description of the prior art

It is known that aminoalkylsilanes such as those having the following general formula are effective as coupling agents on siliceous materials;

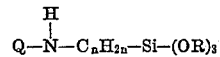

wherein $n$ is a whole integer; Q is a member of the class hydrogen and H—N—C$_m$H$_{2m}$ wherein $m$ is a whole integer; and OR is a hydrolyzable group.

SUMMARY OF THE INVENTION

It is an object of this invention to provide a new silane coupling agent.

It has been found most unexpectedly that the N,N'-bis[(tri(substituted))silylalkylene] - 1,4 - xylene-α,α'-diimine of this invention is effective as an adhesion promoter with organic resins in spite of the absence of a reactive amino group.

A composition of this invention is the organosilane represented by the formula:

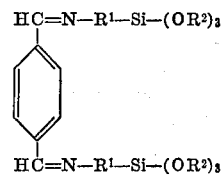

wherein $R^1$ is an alkylene radical of the formula:

—($C_nH_{2n}$)— where $n$ is an integer between 3 and 9 inclusive and $R^2$ is an alkyl, aryl or a heterocyclic group.

Exemplary organosilanes of this invention include the following:

N,N'-bis[(triethoxy)silylpropyl]-1,4-xylene-α,α'-diimine
N,N'-bis[(trimethoxy)silylpropyl]-1,4-xylene-α,α'-diimine
N,N'-bis[(triphenoxy)silylpropyl]-1,4-xylene-α,α'-diimine
N,N'-bis[(tribenzyloxy)silylpropyl]-1,4-xylene-α,α'-diimine
N,N'-bis[(trifurfuroxy)silylpropyl]-1,4-xylene-α,α'-diimine
N,N'-bis[(tri(o-chlorophenoxy)silylpropyl]-1,4-xylene-α,α'-diimine
N,N'-bis[(tri-(p-chlorophenoxy))silylpropyl]-1,4-xylene-α,α'-diimine
N,N'-bis[(tri(tetrahydrofurfuroxy))silylpropyl]-1,4-xylene-α,α'-diimine Suitable alkylene radicals are for example trimethylene and hexamethylene. Branched alkylene radicals such as

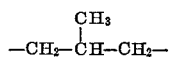

are also useful in this invention.

For the purposes of this invention suitable alkyl, aryl, and heterocyclic groups also include substituted derivatives thereof such as halogen, nitro, alkoxy, alkyl, alkoxyalkyl, etc. Suitable alkyl groups include for example methyl and ethyl. Suitable aryl groups are for example phenyl, o-chlorophenyl, and p-chlorophenyl. Suitable heterocyclic groups comprise for example furfuryl and tetrahydrofurfuryl.

The organosilicon compounds containing an aminosilyl grouping that are useful as starting materials in the preparation of the compositions of this invention are those which contain units of the formula:

wherein $R^1$ and $R^2$ have the above defined meaning. Examples of such aminoalkylsilanes are gamma-aminopropyltriethoxysilane, gamma-aminopropyltrimethoxysilane, gamma-aminopropyltriphenoxysilane, gamma-aminopropyltribenzyloxysilane, gamma - aminopropyltrifurfuroxysilane, gamma-aminopropyltri(o - chlorophenoxy)silane, gamma - aminopropyltri(p - chlorophenoxy)silane, and gamma-aminopropyltri(tetrahydrofurfuroxy)silane.

The organosilicon starting materials containing an aminosilyl grouping are prepared by disclosed method known to those in the art. Terephthaldehyde the other starting material is known and can be prepared by known methods.

The compositions of our invention are produced by forming a mixture of an organosilicon compound containing an aminoalkylsilyl group with terephthaldehyde and maintaining the mixture at a temperature at which the organosilicon compound containing an aminoalkylsilyl grouping and the terephthaldehyde will react. The reaction results in water and an organosilicon compound comprising N,N'-bis[(tri(substituted))silylalkylene]-1,4-xylene-α,α'-diimine wherein the imine group is interconnected to the silicon atom through at least three carbon atoms.

The relative amounts of the organosilicon compounds containing an aminoalkylsilyl grouping and terephthaldehyde, the above mentioned starting materials, are not narrowly critical and can be varied over a wide range. A ratio of amino nitrogen of the organosilicon compound containing the aminoalkylsilyl grouping to carbonyl group of the aldehyde or ketone of at least 1 to 1 is advantageous. No commensurate advantage is gained by using relative amounts other than those described above.

The temperature at which the reaction takes place also is not narrowly critical and can vary from as low as 0° C. to as high as 250° C. It is preferred, however, to carry out the reaction at a temperature of from about 5° C. to 150° C.

The reaction is preferably carried out in a suitable solvent in which both the organosilicon compound containing the aminoalkylsilyl grouping and the terephthaldehyde are soluble, said solvent being non-reactive therewith. Solvents that are miscible with water are preferred, for example, cyclic ethers such as tetrahydrofuran and dioxane, since said water miscible solvents minimize the hydrolysis of the above described $OR^2$ groups by the water formed in the reaction.

The amount of solvent or even the presence of solvent is not critical. Amounts of such solvents of from 10 parts to about 400 parts by weight of the organosilicon compound containing the aminoalkylsilyl and the terephthaldehyde starting materials can be employed. Amounts of such solvents other than those described can be used, but no commensurate advantage is gained thereby.

As has been described above, a by-product of the reaction is water. This water is removed from the reaction mixture by azeotropic distillation by adding thereto a solvent of the above described type that is not only a solvent for the starting materials, but also forms an azeotrope with water. The water can also be removed by heating the reaction mixture to a temperature sufficiently elevated to vaporize the water or by adding a hydrophilic absorbent or adsorbent to the reaciton mixture.

The compounds of this invention are particularly useful as adhesion promoters between fiber glass and other siliceous surfaces, and furan resins and monomeric furan binders. More generally, the compositions of this invention are useful as adhesion promoters between siliceous materials and thermosetting resins.

It is to be understood that by furan resin we mean the product obtained either from the self-condensation of furfuryl alcohol or from the condensation of furfuryl alcohol with furfural. Besides these furan resins we mean other resins incorporating furan derivatives such as furfural-phenol resins, furfuryl alcohol-phenol resin, furfuryl alcohol-formaldehyde resins, and furfuryl alcohol-formaldehyde-urea resins.

It is also to be understood that by monomeric furan binders we mean binders such as the monomeric mixture of furfuryl alcohol, formaldehyde, and urea.

The organosilanes of this invention are used for example in a process for binding material which comprises:
(a) blending a furan resin with an organosilane of the general formula:

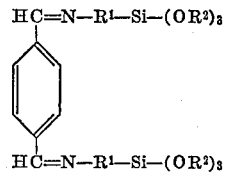

wherein $R^1$ is an alkylene radical, and wherein $OR^2$ is a hydrolyzable group and $R^2$ is selected from the group consisting of alkyl, heterocyclic, and aromatic radicals;
(b) blending a material selected from the group consisting of sand and fiber glass with an acidic catalyst; and
(c) blending the resin-organosilane mixture and the material-acidic catalyst mixture.

We prefer as an acidic catalyst a strong acid such as phosphoric acid or sulphonic acid. Other strong acids such as sulfuric acid may be used. The quantity of acid is chosen to give the desired curing time as is well known to the art. The examples state some useful amounts of p-toluene sulphonic acid.

In the foregoing process, from about 0.01 to about 0.5 part by weight of an organosilane of this invention based on the weight of the furan resin and from about 0.5 to about 5 parts by weight furan resin based on the weight of the siliceous material. While more furan resin and organosilane may be used in both cases, it is considered uneconomical to do so.

Fiber glass laminates, core compositions, and coatings are made from the above bound materials by methods well known in the art. Exemplary procedures are set forth in the examples.

DESCRIPTION OF THE PREFERRED EMBODIMENTS

The following preferred embodiments of the invention are shown for the purpose of illustrating this invention and demonstrating the best mode for practicing the invention. It will be apparent to those skilled in the art that various changes and modifications may be made therein without departing from the spirit and scope of the invention as it is more precisely defined in the subjoined claims.

Throughout the examples where aqueous urea formaldehyde is indicated a non-polymerized aqueous mixture of formaldehyde, urea, and equilibrium reaction products is intended. Aqueous urea-formaldehyde mixtures are sold in commerce. One example is "U.F. Concentrate-85" sold by the Nitrogen Division of Allied Chemical & Dye Corporation, South Point, Ohio. Another aqueous urea-formaldehyde mixture is made by E. I. du Pont de Nemours and Company, Wilmington, Delaware, and is marketed as "Urea-formaldehyde 25–60." Other examples of aqueous urea-formaldehyde mixtures are "Sta-Form 60" by Georgia-Pacific Company, Portland, Oregon, "UF–85" and "UF–78" by Borden Chemical Division, Borden, Inc., New York, N.Y., "Agrimine" by Reichhold Chemical, Inc., White Plains, N.Y., "Formourea 60" by Montecatini Edison of Italy, and "Formol 55" by Badische Anilin- & Soda-Fabrik of Germany.

A typical analysis of Allied Chemical's aqueous urea-formaldehyde mixture ("U.F. Concentrate-85") consists of 59 percent by weight of formaldehyde, 26 percent by weight of urea, and about 15 percent by weight of water.

The aqueous urea-formaldehyde mixture used herein may contain from about 5 percent to about 25 percent by weight of water.

EXAMPLE 1

6.7 grams of terephthaldehyde (0.05 mole) was placed in a 3-necked boiling flask equipped with a reflux condenser, thermometer, and dropping funnel and containing 150 ml. of absolute ethanol. The contents of the flask were warmed to dissolve the terephthaldehyde.

Over a period of 25 minutes, 22.1 grams (0.1 mole) of gamma-aminopropyltriethoxysilane were added to the above mixture which was held at 25° C.

The reaction mixture was then refluxed at 80° C. for 2 hours. The mixture was then distilled under reduced pressure (3.5 mm. Hg) to remove the volatile solvent and the water, a product of the reaction.

After the volatiles had been distilled off, the remaining material was N,N'-bis[(triethoxy)silylpropyl]-1,4-xylene-$\alpha,\alpha'$-diimine. The infrared spectrum showed an imine group at 1648 cm.$^{-1}$ and no carbonyl group at 1695 cm.$^{-1}$. Terephthaldehyde has a carbonyl group at 1695 cm.$^{-1}$. On analysis the product was found to contain 57.78 percent by weight of carbon, 9.21 percent by weight hydrogen, and 5.27 percent by weight of nitrogen. The theoretical composition of N,N'-bis[(triethoxy)propylsilyl]-1,4-xylene-$\alpha,\alpha'$-diimine is 57.74 percent by weight of carbon, 8.95 percent by weight of hydrogen, and 5.18 percent by weight of nitrogen.

EXAMPLE 2

About 0.1 mole of gamma-aminopropyltriethoxysilane was placed in a 100 ml. 3-necked boiling flask containing 0.4 mole of benzyl alcohol and a few boiling chips. The flask was equipped with a nitrogen inlet, thermometer, and a total reflux head/fraction cutter protected with a drying tube containing anhydrous calcium sulfate.

The contents of the flask were then heated for 2 to 4 hours with condensation and under a continuous nitrogen purge. The temperature of the contents of the flask rose from 35° C. to about 200° C. over the 2 to 4 hour period.

At the end of this period, some ethanol had collected in the distillate flask. A slight vacuum was then applied to the contents of the reaction mixture and gradually increased until all the ethanol and unreacted benzyl alcohol had been stripped off. The resultant product which was left in the reaction flask was gamma-aminopropyltribenzyloxysilane.

Following the procedure of Example 1 but using the gamma-aminopropyltribenzyloxysilane prepared above, N,N' - bis[(tribenzyloxy)silylpropyl] - 1,4 - xylene-α,α'-diimine was prepared. The product on analysis was found to contain 73.90 percent by weight of carbon, 6.87 percent by weight of hydrogen, and 3.20 percent by weight of nitrogen. This compared to the theoretical composition by weight of 73.64 percent carbon, 6.62 percent hydrogen, and 3.07 percent nitrogen.

EXAMPLE 3

Aminosilanes from various hydroxy compounds and gamma-aminopropyltriethoxysilane were prepared following the procedure of Example 2. Equivalent amounts of the hydroxy compound given in Table I were substituted for benzyl alcohol. The percentage composition of the product aminosilanes as compared to the theoretical composition is reported in Table I.

TABLE I

| Test | Hydroxy compound | Ratio of percent by weight composition of product to theoretical composition | | |
|---|---|---|---|---|
| | | Carbon | Hydrogen | Nitrogen |
| 1 | Phenol | 68.35/69.01 | 6.46/6.34 | 3.9/3.83 |
| 2 | p-Chlorophenol | 53.41/53.80 | 4.35/4.30 | 3.11/2.99 |
| 3 | o-Chlorophenol | 54.51/53.80 | 4.60/4.30 | 3.02/2.99 |
| 4 | Furfuryl alcohol | 57.14/57.27 | 6.36/6.14 | 3.91/3.71 |

Using the procedure of Example 1 but substituting the product aminosilanes prepared above, respectively; the following organosilanes are prepared:

N,N'-bis[(triphenoxy)silylpropyl]-1,4-xylene-α,α'-diimine

N,N'-bis[(tri(p-chlorophenoxy))silylpropyl]-1,4-xylene-α,α'-diimine

N,N'-bis[(tri(o-chlorophenoxy))silylpropyl]-1,4-xylene-α,α'-diimine

N,N'-bis[(trifurfuroxysilylpropyl)]-1,4-xylene-α,α'-diimine

EXAMPLE 4

In Test 5, 600 grams of a mixture of foundry sands were blended with 5 mls. of 70 percent p-toluene sulfonic acid in water for 2 minutes with a laboratory mixer. 36 grams of a binder which comprised 92 percent by weight of furfuryl alcohol and 8 percent by weight "U.F. Concentrate-85" was added to the acid-sand mixture. After a homogeneous mixture was attained, the mix was formed into tensile strength specimen with an American Foundrymen's Society Standard Specimen Container and Rammer. The tensile strength of the specimen after curing for 5 days under ambient conditions was determined with an Instron Tester Model TT-D. The average tensile strength of the specimen was 1068 p.s.i.

Test 6 was made in an identical manner to Test 1 except for the addition of 0.09 gram of N,N'-bis[(triethoxy)silylpropyl]-1,4-xylene-α,α'-diimine. The average tensile strength of the specimen was 1937 p.s.i.

EXAMPLE 5

A furan fiber glass laminating resin was prepared as follows: Furfuryl alcohol (198 parts by weight), formaldehyde (40.7 parts by weight of a solution consisting of 39 parts by weight of formaldehyde, 12 parts by weight of methanol, and 49 parts by weight of water), and oxalic acid (0.78 part by weight of a solution consisting of 10 parts by weight of oxalic acid in 90 parts by weight of water) were mixed at room temperature in a 15-gallon stainless steel kettle equipped with a steam jacket, thermometer well, and reflux condenser. The pH of the resulting solution measured 1.95. The batch was heated over a period of 60 minutes to a temperature of 90° C., at which point reflux began. At this point the hot cup viscosity as measured by a Cenco consistency cup No. 27145 was 37 seconds. The batch refluxed at 98–100° C. until the hot cup viscosity was about 41 seconds. The resin was immediately neutralized 0.39 part by weight of triethanolamine and cooled. The pH was 6.2. The batch was distilled at temperatures up to 120° C. and pressures down to 50 mm. of mercury. The viscosity of the resin at 25° C. was then 12,000 cps. After dilution with 28 parts by weight of furfural, a viscosity of 400 cps. was obtained.

Using the laminating resin prepared above, two fiber glass laminates were prepared as follows: A long sheet of polyethylene terephthalate was laid out on a flat working surface. In Test 7 the resin prepared above was catalyzed with 4 percent by weight based on the weight of the resin of a catalyst solution and was applied to a sheet of glass cloth which had been heat cleaned. The catalyst solution was 50 percent by weight of p-toluene sulfonic acid in 35 percent by weight of methanol and 15 percent by weight of water. The glass cloth was worked into the wet resin using a conventional resin roller. The steps of spreading the resin, laying a sheet of glass cloth, and rolling the resin was repeated four more times to provide a 6-ply laminate. A thin top layer of resin was added to the uppermost resin wetted glass cloth. The sample of Test 7 was cured for 16 hours at about 27° C. and then for 3 hours at 180° F. The measured physical properties of the laminate is reported below in Table II.

Test 8 was prepared as Test 7 except that 1 percent by weight of N,N'-bis[(triethoxy)silylpropyl]-1,4-xylene-α,α'-diimine based on the weight of the resin was added to the resin. The measured physical properties of the laminate prepared in this test is also given in Table II.

TABLE II

| Test | Flexural strength, p.s.i. | Modulus, p.s.i. | Percent elongation |
|---|---|---|---|
| 7 | 17,539 | 492,398 | 3.57 |
| 8 | 41,788 | 1,304,038 | 3.19 |

The above flexural strength, modulus, and elongation were measured with an Instron Tester Model TT-D.

The above examples clearly demonstrate the accomplishment of this invention. In Examples 1–3, inclusive, methods of preparing the compositions of this invention are demonstrated. In Example 4, a foundry core using a monomeric furfuryl alcohol binder in Test 5 was found to have a tensile strength of 1068 p.s.i. When 0.09 gram of N,N'-bis[(triethoxy)-silylpropyl] - 1,4 - xylene-α,α'-diimine was added to the above binder in Test 6, the tensile strength of the core was found to be 1937 p.s.i. Test 6 is in accord with this invention. Test 5 is not in accord with this invention but was prepared as an example of a binder which does not contain the organosilane of this invention. The tremendous increase in tensile strength from 1068 p.s.i. to 1937 p.s.i. clearly demonstrates the exceptional usefulness of the organosilanes of this invention.

In Example 5, Test 7, a fiber glass laminate using a furan laminating resin was found to have a flexural strength of 17,539 p.s.i. and a modulus of 492,398. In Test 8 when 1 percent by weight of N,N'-bis[(triethoxy)silylpropyl]-

1,4-xylene-α,α'-diimine was added to the furan laminating resin, the fiber glass laminate had a surprising increase in flexural strength to 41,788 p.s.i. and an increase in modulus to 1,304,038 p.s.i. as compared to the laminate of Test 7. Test 7 is not in accordance with this invention but is an example of a fiber glass laminate made with a laminating resin which does not contain the organosilanes of this invention. Test 8 is in accord with this invention.

From the foregoing description we consider it to be clear that the present invention contributes a substantial benefit to the art by providing a new and useful organosilane.

We claim:

1. An organosilane of the general formula:

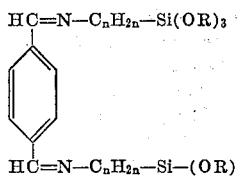

$$HC=N-C_nH_{2n}-Si(OR)_3$$

$$HC=N-C_nH_{2n}-Si-(OR)_3$$

wherein $n$ is a whole integer between 3 and 9 inclusive and R is a member selected from the group consisting of furfuryl and tetrahydrofurfuryl.

2. The composition of claim 1 wherein $n$ is 3 and R is furfuryl.

3. The composition of claim 1 wherein $n$ is 3 and R is tetrahydrofurfuryl.

References Cited

UNITED STATES PATENTS 3,681,420  8/1972  Brown et al. _____ 260—448.8 R

JOHN D. RANDOLPH, Primary Examiner

U.S. Cl. X.R.

161—193, 206; 260—347.7, 448.8 R